Figure 1:
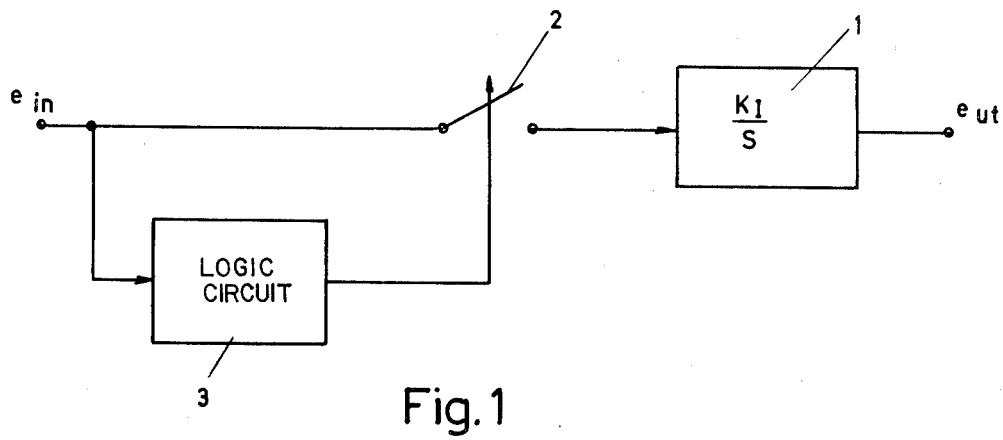

United States Patent [19]
Eriksson

[11] 4,059,751
[45] Nov. 22, 1977

[54] LOGIC CONTROLLED INTEGRATOR

[75] Inventor: Sven Willner Eriksson, Karlskoga, Sweden

[73] Assignee: AB Bofors, Bofors, Sweden

[21] Appl. No.: 617,557

[22] Filed: Sept. 29, 1975

[30] Foreign Application Priority Data

Oct. 21, 1974 Sweden .................................. 7413199

[51] Int. Cl.² ............................................. G06G 7/18
[52] U.S. Cl. ...................................... 364/829; 328/127
[58] Field of Search ............ 235/183, 61.5 R, 61.5 A, 235/61.5 S; 328/127; 333/19

[56] References Cited

U.S. PATENT DOCUMENTS

| | | | |
|---|---|---|---|
| 2,675,469 | 4/1954 | Harker et al. | 235/183 |
| 3,311,740 | 3/1967 | Urban | 235/183 |
| 3,404,262 | 10/1968 | Udall | 235/183 |
| 3,444,361 | 5/1969 | Bekey | 235/183 |
| 3,609,314 | 9/1971 | Anderson | 235/183 |
| 3,685,159 | 8/1972 | Erhard | 235/61.5 S |
| 3,783,392 | 1/1974 | Drake et al. | 328/127 |
| 3,842,416 | 10/1974 | Eto | 340/347 |
| 3,883,863 | 5/1975 | Willard | 340/347 |
| 3,885,760 | 5/1975 | Grimes et al. | 235/183 |

FOREIGN PATENT DOCUMENTS

| | | | |
|---|---|---|---|
| 1,548,794 | 9/1969 | Germany | 328/127 |

*Primary Examiner*—Charles E. Atkinson
*Attorney, Agent, or Firm*—Pollock, Vande Sande & Priddy

[57] ABSTRACT

The input to an integrator is controlled by a logic circuit to reduce tracking errors caused by changes in acceleration. In one embodiment, the logic circuit obtains the derivative of the input signal and multiplies it with the input signal. The input signal is fed to the integrator through a switch which is closed when the product of the input signal and its derivative is positive, and which is open when the product is negative.

3 Claims, 6 Drawing Figures

LOGIC CONTROLLED INTEGRATOR

The present invention relates to an integrator, the input signal of which is arranged to be controlled by certain logic conditions.

In control system, it is previously known to utilize linear integrator, which are then usually included in a so-called PID filter. In control systems of the kind in which changes of speed occur, said linear integrators give satisfactory results, while in control systems of the third order, disturbances that occur in the form of changes of acceleration give rise to tracking errors in the system. Particularly in control systems of the kind where an operator is to keep an observation device in the form of a sight, a telescope, radar, IR equipment etc. continuously directed against an object which moves in relation to the observation device, it is usual that such disturbances occur. These disturbances then occur primarily when flying targets pass on a straight course in relation to the observation device.

The purpose of the present invention is therefore to achieve an integrator with the aid of which it is possible to reduce the tracking error that occurs in control systems of the above-mentioned kind. The input signal to the integrator is then controlled by certain logic conditions, and the device has been given the characteristics indicated in the claims.

Figure 2:
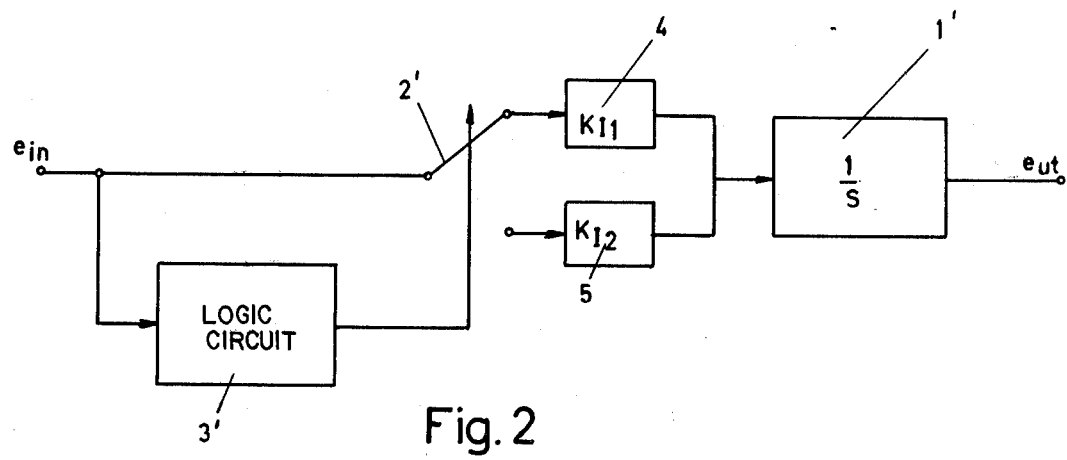
Figure 3:
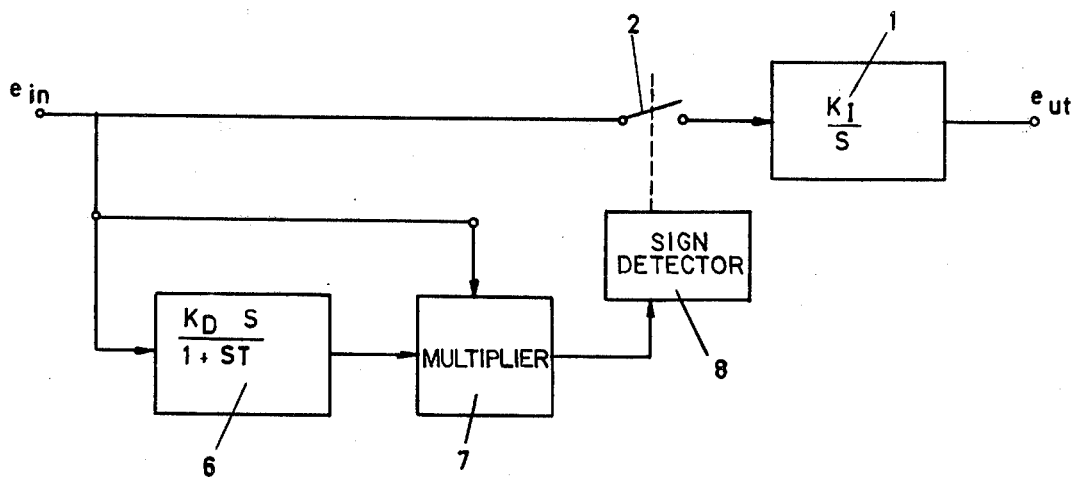
Figure 4:
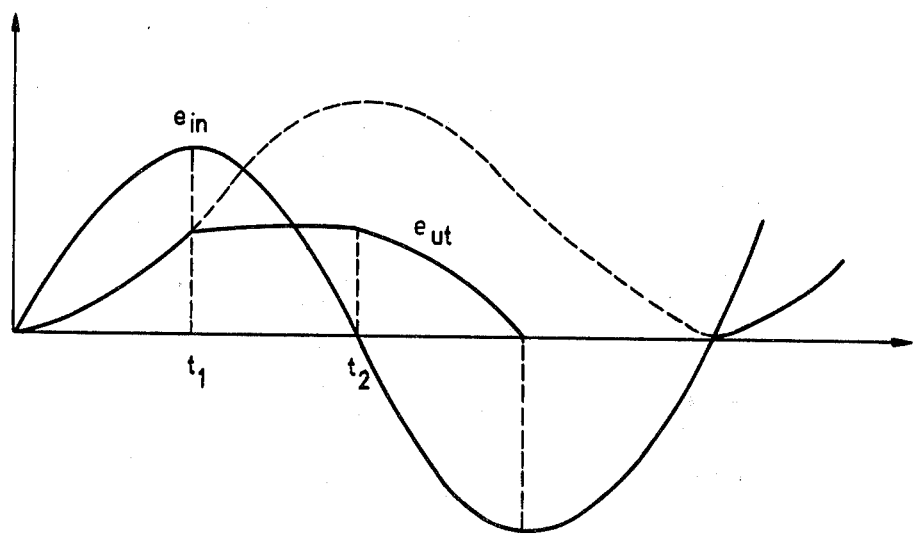
Figure 5:
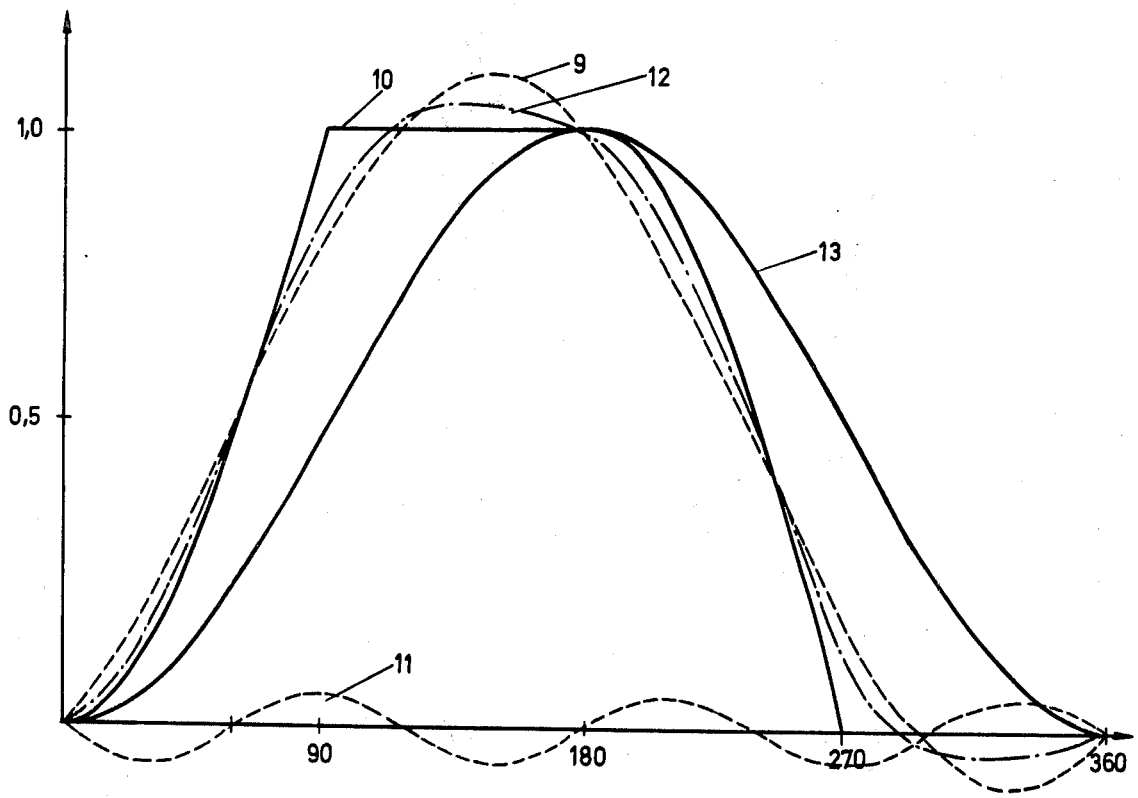

The invention will be described in more detail with reference to the accompanying figures, in which FIG. 1 shows a block diagram of the invention, FIG. 2 shows a block diagram for switching between two different amplification factors, FIG. 3 shows an appropriate embodiment of the logic controlled integrator, FIG. 4 shows the input and output signals from the logic controlled integrator, FIG. 5 shows the Fourier division of the output signal from the logic controlled integrator, and FIG. 6 a control system comprising a logic controlled integrator according to the invention.

FIG. 1 shows an integrator 1, the input of which is connected to a switch 2. When the switch is closed, an input signal $e_{in}$ is fed to the integrator, and when the switch is open there is no input signal on the input of the integrator. The input signal $e_{in}$ is also fed to a logic circuit 3 which controls the switch 2. With the aid of the logic circuit 3 it is possible to control the time of operation of the integrator. When the input signal consists of a periodic signal, it is thus possible to allow the input signal to be connected to the integrator only during a certain part of the period. As the integrator is not connected during the whole of the period, however, the amplitude of the output signal $e_{ut}$ will be lower than in the case at linear integration. However, the amplitude can easily be adjusted by raising the amplification factor $K_I$.

Further, the logic controlled integrator gives less phase shifting compared with a linear integrator, which usually is an advantage in control systems.

FIG. 2 shows a variant of the device according to FIG. 1. In this case, the input of the integrator is connected to two amplifiers 4, 5, with different amplification factors ($K_{I1}$ and $K_{I2}$). As in FIG. 1, the switch 2' is controlled by a logic circuit 3' for connecting the different amplifiers. The device according to FIG. 1 constitutes a special case of FIG. 2, in which one of the amplification factors is zero.

The logic circuit that controls the switch comprises a derivation circuit 6 in series with a multiplier 7, see FIG. 3. The input signal $e_{in}$ is then fed to both the derivation circuit 6 and the multiplier 7. The signal transmitted from the multiplier is the product of the input signal $e_{in}$ and its derivatives $\dot{e}_{in}$ from the output of the derivation circuit. This product is sensed with regard to the sign in a circuit 8, which controls the switch 2. The function that controls the switch can then be written $e_{in} \cdot \dot{e}_{in} \geq 0$ Switch closed $e_{in} \cdot \dot{e}_{in} < 0$ Switch open FIG. 4 shows the appearance of an input and output signal to the logic controlled integrator. If $e_{in}$ consists of a sinusoidal signal, $e_{ut}$ will be a periodic function with the same frequency, and which can be Fourier divided. Up to the maximum value at $t$, $e_{in} \cdot \dot{e}_{in} \geq 0$ and the integrator functions normally. From $t_1$ to $t_2$ $e_{in} \cdot \dot{e}_{in} < 0$, and the switch is then open and $e_{ut}$ is constant. At $t_2$ the switch is closed again etc. The dash line curve shows the output signal from a linear integrator with the same input signal. It will be noted that the logic controlled integrator gives less phase shifting (estimated to be 30° less) and a lower amplitude.

With the aid of a Laplace operator, the function of the integrator can be designated $K_I/s$, in which $K_I$ is the amplification factor of the integrator. The function of the derivation circuit 6 can be designated $(K_D \cdot s)/(1 + sT)$ in which $K_D$ is the amplification factor and $1/(1 + sT)$ is the filtering which is inserted in the derivative branch to filter out any high-frequency noise in $e_{in}$ which can disturb the intended function.

If this time constant is set equal to zero and we assume that $K_I = K_D = 1$, with an input signal of the appearance $e_{in} = \sin \omega t$, $e_{ut}$ can be calculated to be $$e_{ut} = (0.593/\omega) \angle -57.3$$

Compared with an ordinary (linear) integrator, the output signal of which is $$(1/\omega) \angle -90°$$

by increasing the amplification factor $K_I$ by the factor $(1/0.593) = 1.69$, it is thus possible to obtain an integrator with 32.7° less phase shift.

In the above-mentioned calculation of $e_{ut}$, the harmonics have been considered to be negligible. If these have a great amplitude, $e_{ut}$ as above gives a poor representation of the non-linearity. Only the odd harmonics give a contribution, as it will be noted from FIG. 4 that the even harmonics are zero.

If then the descriptive function for $e_{ut}$ is designated $N_{f1}$, the third harmonic with $N_{f3}$ etc., we obtain $$N_{f3} = -(1/6\pi\omega)$$

$$N_{f5} = (1/15\pi\omega)$$

and $$|N_{f3}/N_{f1}| = 0{,}090$$

$$|N_{f5}/N_{f1}| = 0{,}035$$

Thus, the harmonic content is low and $N_{f1}$ is a good representation of the non-linearity. This will also be noted from FIG. 5, in which the above-mentioned functions have been shown for $\omega = 1$. $K_I$ has then been set equal to 1 for the logic controlled integrator and equal to 0.5 for the ordinary integrator. From the FIGURE it will be noted that $N_I$ (curve 9 in FIG. 5) quite well follows the output signal (curve 10) of the logic controlled integrator. The addition of $N_{I3}$ (curve 11) improves the situation rather insignificantly. In the figure, $N_{I1} + N_{I3}$ is represented by the curve 12, the dot-dash line. Curve 13 is the output signal from a linear integrator.

Figure 6:
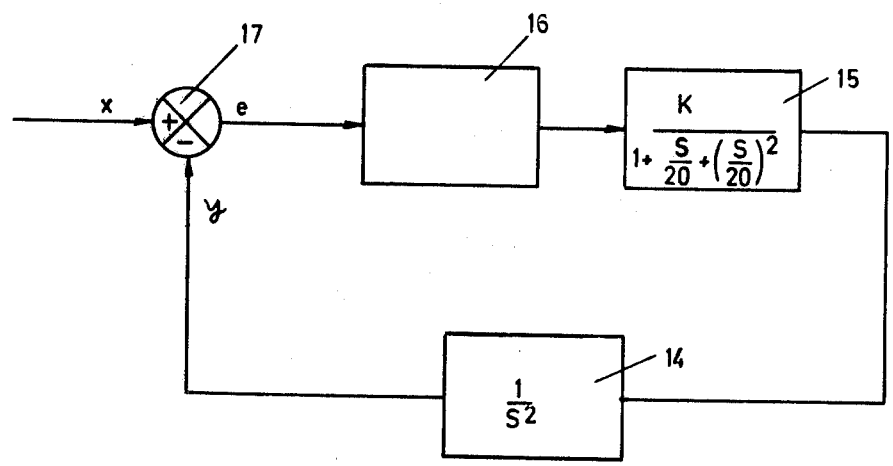

FIG. 6 shows a control system in which the logic controlled integrator described above is particularly well suited for use. The control system comprises an operator which, dependent on an error value $e$, which constitutes the difference between a target value and an actual value, achieves a pilot signal for aiming against and the subsequent tracking of a target. It is then assumed that the target, in addition to the acceleration, also shows acceleration changes. As mentioned above, such a movement can occur when an aircraft passes on a straight course in front of the observation device. The control system comprises a comparator device 17 which gives an error value $e$ which is the difference between a target value $x$ and an actual value $y$, two integrations which can be illustrated by the block 14 and a second order delay circuit, the block 15. In order that an acceleration change shall be followed with as small a position error as possible, the system should appropriately be of the third order, and a filter 16 of the PID type or PLID type should be inserted in the circuit in series with the block 15. The filter of the PLID type then comprises a logic controlled integrator (LI).

The frequency function for the PID filter can be written $$G_I(j\omega) = \frac{K_I}{j\omega} (1 + \frac{j\omega}{K_I} - \omega^2 \frac{K_D}{K_I})$$

we then obtain $$|G_I(j\omega)| = \sqrt{(1 - \omega^2 \frac{K_D}{K_I})^2 + \frac{\omega^2}{K_I^2}} \cdot \frac{K_I}{\omega} \text{ and}$$

$$\underline{/G_I(j\omega)} = \text{arctg} \frac{\frac{\omega}{K_I}}{1 - \omega^2 \frac{K_D}{K_I}} - 90°$$

and the frequency function for the PLID filter is written $$G_{LI}(j\omega) = \frac{K_I}{j\omega} (\frac{1}{2} + \frac{j\omega}{K_I} + \frac{j}{\pi} - \omega^2 \cdot \frac{K_D}{K_I})$$

and then $$|G_{LI}(j\omega)| = \sqrt{(\frac{1}{2} - \omega^2 \frac{K_D}{K_I})^2 + (\frac{\omega}{K_I} + \frac{1}{\pi})^2} \cdot \frac{K_I}{\omega}$$

$$\underline{/G_{LI}(j\omega)} = \text{arctg} \frac{\frac{\omega}{K_I} + \frac{1}{\pi}}{\frac{1}{2} - \omega^2 \frac{K_D}{K_I}} - 90°$$

If the properties of the closed system are studied in the three cases below, certain improvements can be shown with a logic controlled integrator.
1. PID filter: $K_I = 1.4$; $K_D = 0.7$; $K = 10$
2. PID filter: $K_I = 2$; $K_D = 0.5$; $K = 10\sqrt{2} \approx 14.1$
3. PID filter: $K_I = 4$ (for logic controlled integrator) $K_D = 0.7$; $K = 10$ From this, it will be noted that cases 1 and 3 are rather equal as regards the damping with $M_p = 3$dB while case 2 has $M_p = 5$dB and thus is not quite as good. Case 3 gives, from the point of view of calculation with descriptive function, $4 \cdot (0.593/1.4) = 1.7$ times higher loop amplification than case 1 with similar damping properties. This can be regarded as the advantage of having a logic controlled integrator if the stability properties of the system are an essential factor. Otherwise, cases 2 and 3 above can be regarded as being practically equal. If, instead, a monotonic increasing disturbance is regarded, cases 3 will be $\sqrt{2}$ times better than case 2, and $2 \cdot \sqrt{2}$ times better than case 1.

I claim:
1. A control system including an integrator controlled by a logic circuit comprising:
an integrator having an input terminal,
switching means for at times connecting an input signal $e$ to said integrator input terminal,
logic means driven by said input signal $e$ for controlling said switching means to connect said input signal $e$ to said integrator input terminal, said logic means including a derivative circuit to produce the derivative $\dot{e}$ of said input signal and in which said logic means forms the product of $e \cdot \dot{e}$.
2. The circuit of claim 1 in which said logic means controls said switching means in dependence upon the sign of said product.
3. The circuit of claim 1 in which said logic means controls said switching means to be closed when said product is positive, and opened when said product is negative.

* * * * *